United States Patent [19]

Yoda

[11] 3,954,242

[45] May 4, 1976

[54] PLASTIC FASTENER

[75] Inventor: Tohru Yoda, Yokohama, Japan

[73] Assignee: Nifco Inc., Tokyo, Japan

[22] Filed: Oct. 10, 1974

[21] Appl. No.: 513,790

[30] Foreign Application Priority Data

Oct. 11, 1973 Japan........................ 48-117345[U]

[52] U.S. Cl.............................. 248/223; 339/66 M; 339/91 R

[51] Int. Cl.$^{2}$..................... H01R 13/54; H02B 1/02; H02G 9/00

[58] Field of Search................ 248/223; 339/17 LM, 339/17 M, 65, 66 M, 91 R; 317/101 AH

[56] References Cited

UNITED STATES PATENTS

| | | | |
|---|---|---|---|
| 2,894,241 | 7/1959 | McKee | 248/223 X |
| 2,957,155 | 10/1960 | Ehrlich | 339/91 R X |
| 3,150,906 | 9/1964 | Chambon et al. | 339/91 R X |
| 3,534,938 | 10/1970 | Jordan et al. | 248/223 X |

FOREIGN PATENTS OR APPLICATIONS

| | | | |
|---|---|---|---|
| 1,125,990 | 7/1960 | Germany | 339/17 LM |
| 1,433,439 | 12/1965 | France | 339/91 R |

*Primary Examiner*—J. Franklin Foss
*Attorney, Agent, or Firm*—J. R. Halvorsen; R. W. Beart

[57] ABSTRACT

Disclosed is a molded plastic fastener for plate like members which is formed of synthetic resin having a suitable resiliency. The fastener is formed with a first portion including a groove through which an edge portion of a plate like member is inserted and within which the member is resiliently held and a positioning member for preventing the member from moving in the groove and a second portion including an anchor leg for anchoring the device to a support structure.

6 Claims, 9 Drawing Figures

PLASTIC FASTENER

BACKGROUND OF THE INVENTION

The present invention relates to a securing device or fastener suitable to hold a plate like member such as printed circuit board etc. in a desired position with respect to a support structure.

Printed circuit boards have conventionally been supported with respect to a wall or panel of the casing of the electric device concerned by bolts and nuts and, therefore, it has been difficult to mount and/or dismount the same with respect to the support structure.

An object of the present invention is to provide a novel fastener device for plate like members by which the member can easily be mounted and dismounted with respect to a support structure.

Other objects and features of the present invention will become clear from the description of preferred embodiments of the present invention given herein with reference to the attached drawings.

Figure 1:
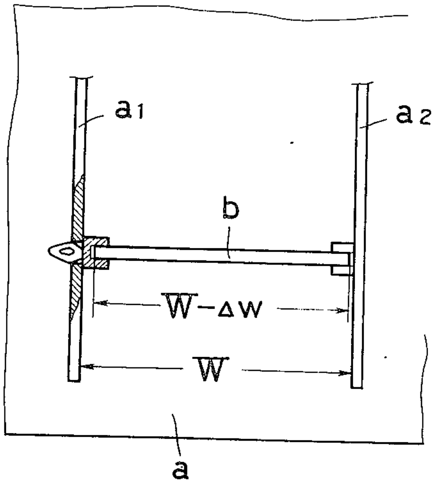
FIG. 1(A) is an explanatory view of an embodiment of the present invention when used to support a plate like member at one end thereof.
FIG. 1(B) is an explanatory view of the same embodiment when two fastener are used to support the member at both ends thereof.
Figure 1:
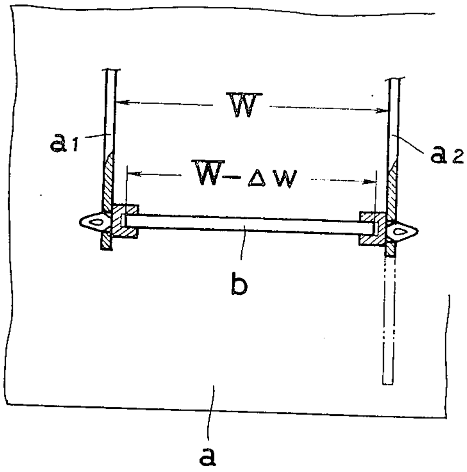

DESCRIPTION OF THE EMBODIMENTS:

The present invention resides in a fastener device formed of synthetic resin such as nylon 6, nylon 66, polyester or polypropylene and formed with a groove into which a plate like member or printed circuit board is to be inserted, a positioning portion for preventing the board from undesirably moving and an anchor portion for anchoring the device with respect to a support structure. The present fastener device can effectively be used in a case where, as shown in FIGS. 1(A) or 1(B), a printed circuit board *b* having width of W-Δw is to be fixedly mounted between support plates $a_1$ and $a_2$ which are separately provided on a structure *a'* such as chassis with an internal width W.

An explanation of the present fastening device is now given with reference to the embodiments shown in the drawings. Looking first at FIGS. 2 to 4, a molded plastic body 1 has a holding groove 4 defined by a bottom or center wall 2 and oppositely provided walls 3. Each of the walls 3 has a cavity 12 within which a bowed flat spring 13 is disposed. The cavity 12 and the spring 13 will be described later. The holding groove 4 serves to fixedly hold the board *b* as shown in FIG. 1(A) or 1(B) and, therefore, the width of the groove should be chosen so as to fit the width of the board *b* to be supported.

Figure 3:
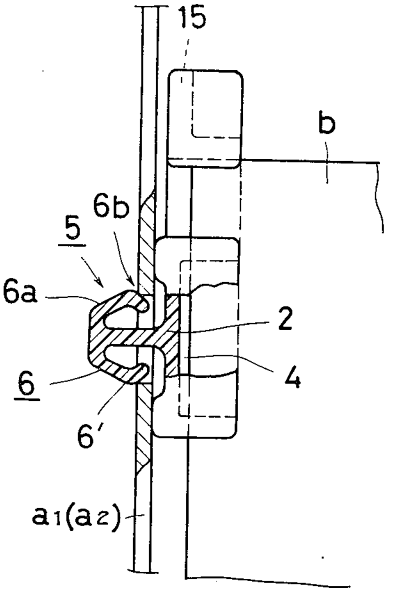
FIG. 3 is a partial cross sectional side view of the embodiment in FIG. 2, showing the anchoring state thereof with respect to a support structure.
Figure 5:
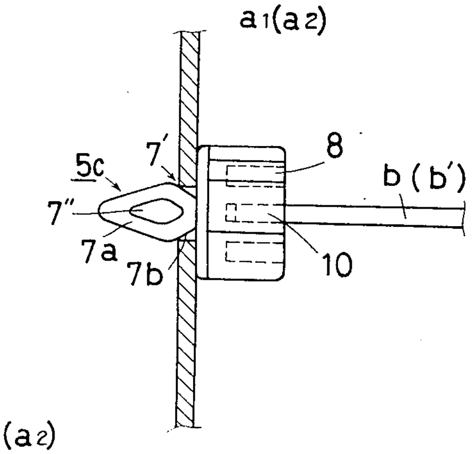
FIG. 5 is a plan view of a modification of the anchor leg of the securing device.

The body 1 is further formed with a resilient anchor leg 5 in the opposite side to the groove 4. The anchor leg 5 is adapted to be inserted into an opening provided at a desired position in the support plate $a_1$ (or $a_2$) to position the body 1 at the desired position. The anchor leg is a arrow-shaped leg 5 as shown in FIG. 3 or rhombic-shaped leg 5C as shown in FIG. 5. In the arrow-shaped anchor leg 5 in FIG. 3, each barb 6 of the arrow comprises a forward tapered portion **6*a* and a rearward tapered portion 6*b* which are connected by a connecting portion 6'. The opening into which the anchor leg 5 is inserted is made slightly smaller in diameter than the width of the barb 6 measured between the connecting portions 6' so that, when it is pushed into the opening, the forward taper portions 6*a* are urged against the periphery of the opening, the rearward taper portions 6*b* provide a force on the body 1 due to their resiliency, which force tends to force the body 1 toward the support plate $a_1$ resulting in a reliable securing of the body 1** to the support plate *a*. The configuration of the anchor leg 5 is, of course, not limited to that shown in FIG. 3. The rhombic configuration leg **5*c* shown in FIG. 5 provides the same function as obtained by the arrow configuration in FIG. 3. While, in the arrow configuration leg 5, the barbs 6 are supported by the center shaft, the rhombic configuration leg 5*c* has no such center shaft and, instead, the forward taper portions 7*a* and the reaward taper portions 7*b* which are connected to the portions 7*a* by connecting portions 7' are directly connected to the body 1. The center portion 7'' of the rhombic anchor leg 5*c* is cut away to provide the same resiliency as that of the taper portions 6*a* and 6*b* of the arrow anchor leg 5 in FIG. 3. The functions of the taper portions 7*a* and 7*b* are the same as those of the taper portions 6*a* and 6*b* respectively. Any other configuration of the anchor leg may be employed provided that it can provide the same function as that of the arrow anchor leg 5 in FIG. 3 or the rhombic anchor leg 5*c* in FIG. 5**.

Since the purpose of the provision of the anchor leg 5 on the opposite side of the body 1 to the groove 4 thereof is to fasten the board *b* between the support plates $a_1$ and $a_2$, it is also possible to provide such leg on either or both of the outer side surfaces of the walls 3.

The body 1 has a hook arm 8 extending from one end of either of the walls 3. The hook arm 8 inclines toward the other wall 3 to provide an inward biasing force.

Figure 4:
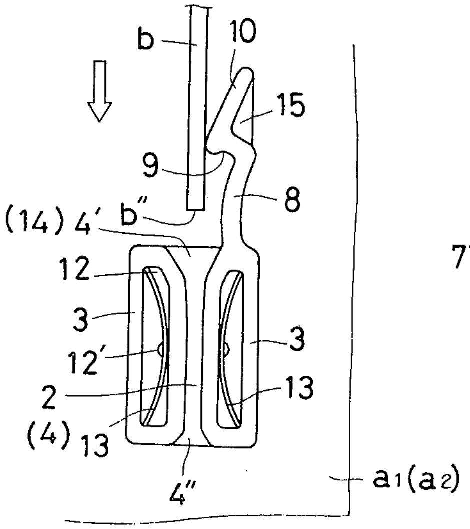
FIG. 4 is a similar figure to FIG. 2, showing how to insert the plate like member into the securing device.

The arm 8 is provided with a hook portion 15 at the free end thereof which substantially covers an extension of one end 4' of the groove 4 to serve as a stopper for preventing the board *b* from undesirably moving in the groove 4 after, as shown in FIG. 4, one edge b'' of the board *b* is inserted in the arrow direction passing through a sloped guide portion 10 of the hook portion into the groove 4 and the other edge *b'* of the board *b* is caught by a shoulder 9 of the hook portion due to the resiliency of the arm 8. The insertion of the board need not be in the direction of the arrow in FIG. 4 but may, instead, be from the end 4'' of the body 1. In order to reinforce the shoulder, a rib 15 may be provided as shown.

Figure 2:
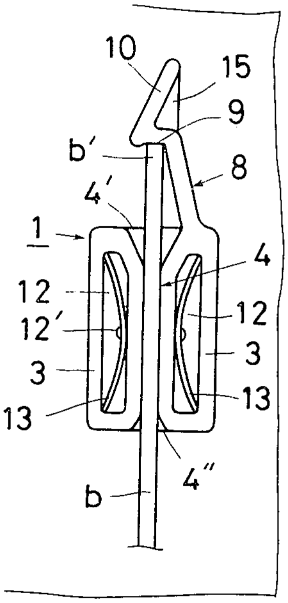
FIG. 2 is a front view of another embodiment of the present invention, showing the plate holding state thereof.

In the state shown in FIG. 2, since the edge *b''* of the board b generally will contact with or be in close proximity to the wall or panel $a'$ on which the support plates $a_1$ and $a_2$ are provided, the board cannot move in the inserting direction thereof. When it is desired to remove the board *b* from the body 1 to, for example, perform maintainance, the operator can push the guide portion 10 of the arm 8 outwardly and then can easily draw away the board *b* in the opposite direction to the inserting direction.

The embodiments described heretofore have a hook portion including the shoulder 9 by which the edge $b'$ of the board *b* is caught to prevent undesirable movement of the board *b*.

Figure 6:
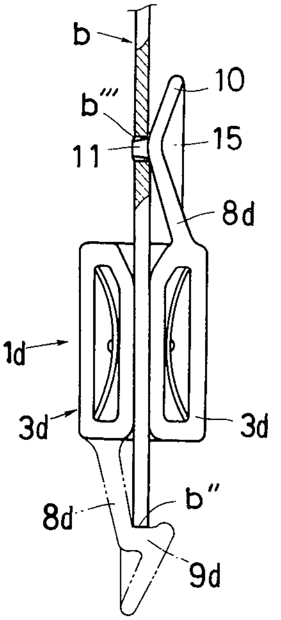
FIG. 6 is a front view of another embodiment of the present invention.
Figure 7:
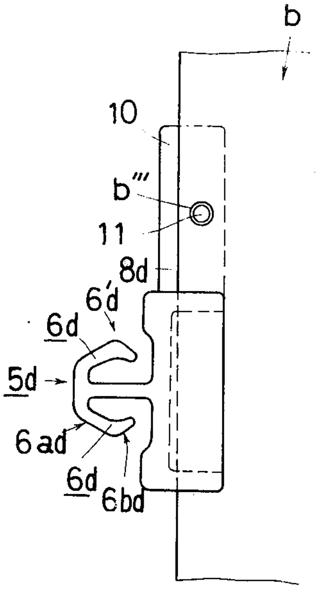
FIG. 7 is a side view of the securing device in FIG. 6.

FIGS. 6 and 7 show another embodiment of the present securing device, wherein similar parts are identified by similar numerals with the addition of the suffixes '*d*', in which the hook portion of the arm 8*d* is modified. In FIGS. 6 and 7, the shoulder 9 which was shown in FIGS. 2 through 4 is replaced by a protrusion 11. The protrusion 11 is adapted to be received in a notch or hole $b'''$ provided in the edge portion of the board *b*. That is, instead of shoulder 9 in FIGS. 2 to 5, protrusion 11 enters into the hole $b'''$ and holds the board *b* inplace. In this embodiment, it is possible to further provide an arm such as the arm 8*d* in FIGS. 2 to 5 on the opposite end of the body 1*d* as shown by the chain line in FIG. 6. In such case, the board *b* is supported at not only the edge $b'$ or $b''$ but also the hole $b'''$, so that the holding of the board *b* is further improved.

Figure 8:
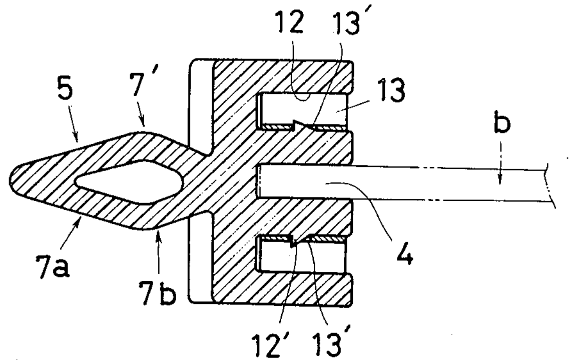
FIG. 8 is a partial cross sectional view of the fastener device in FIG. 5, showing in detail the spring bias construction thereof.

It was mentioned previously that either or both of the walls 3 of the body 1 has a cavity 12 and a bowed flat spring 13 is mounted therein. FIG. 8 shows the arrangement of the cavity 12 and the spring 13 which can be utilized in all embodiments. The purpose of the provision of the cavity 12 is to reduce the amount of synthetic material required to mold the device. The provision of such cavity may reduce the resiliency of the wall 3 and this will lower the board holding force of the body 1. In order to overcome this problem, the bowed flat spring 13 is provided. By suitably selecting the stiffness of the spring 13, improved board holding characteristics are obtained. To put the spring 13 in the cavity 12 stably, a projection 12' which has a hook having a portion tapered toward the open end of the cavity is formed at about the center area of an inner side wall of the cavity 12. The projection 12' allows the spring to pass inward but prevents reverse movement. The opposite ends of the spring 13 fit the outer two corners of the cavity when the spring is put in place so that the bowed portion of the spring 13 contacts the center area of the inner side wall. The spring 13 is provided with a notch or hole 13' at the position thereof corresponding to the protrusion 12' in the inner wall. When the spring 13 is inserted into the cavity 12, the projection 12' enters the hole 13' to thereby prevent the spring 13 from escaping out from the cavity.

What is claimed is:

1. A one-piece plastic fastener for insulatingly fixing a plate-like member to a support structure comprising a body formed with a groove extending length-wise along one surface of said body and adapted to hold the plate-like member therein, at least one cavity extending longitudinally in said body and disposed parallel to but spaced from said groove to form a dielectric resilient wall between the cavity and the groove, at least one spring member disposed within said cavity and acting against the resilient wall adjacent to said groove to provide a resilient bias against the plate-like member when positioned in said groove, anchoring means extending perpendicular from said body for securing same to the support structure, a resilient integral arm extending longitudinally away from one end of said body having means for contacting and positioning the member held in said groove in a retained fashion.

2. A moulded plastic fastener as set forth in claim 1, wherein the contact means on said arm is formed at the free end thereof and includes a cam surface terminating in a shoulder facing said body for catching an edge of the plate-like member.

3. A molded plastic fastener as set forth in claim 1, the contact means on said arm is formed in the vicinity of the free end thereof with a protrusion which is adapted to enter a hole provided in the plate like member.

4. A one-piece plastic fastener as set forth in claim 1 wherein at least one wall forming said cavity is provided with a detent means and said spring means is provided with means for cooperating with said detent to prevent withdrawal of said spring from within said cavity.

5. A one-piece plastic fastener of the type set forth in claim 4 wherein said body is provided with two cavities located on opposite sides of said groove and a spring means in each cavity acting in a direction in opposition to the other spring means to thereby pinch said plate-like member when disposed is said groove.

6. A one-piece plastic fastener as set forth in claim 5 wherein said cavities are generally rectangular in shape and said spring members are flat, bowed sheet material having their convex sides in opposition and in contact with the resilient walls of said cavities adjacent said groove and having their ends in contact with the opposite walls of the respective cavities in said body.

* * * * *